(12) United States Patent
Song

(10) Patent No.: US 10,013,078 B2
(45) Date of Patent: Jul. 3, 2018

(54) OPTICAL NAVIGATION DEVICE AND FAILURE IDENTIFICATION METHOD THEREOF

(71) Applicant: PIXART IMAGING (PENANG) SDN. BHD., Penang (MY)

(72) Inventor: Willie Song, Penang (MY)

(73) Assignee: PIXART IMAGING INC., Hsin Chu County (TW)

( * ) Notice: Subject to any disclaimer, the term of this patent is extended or adjusted under 35 U.S.C. 154(b) by 809 days.

(21) Appl. No.: 14/250,501

(22) Filed: Apr. 11, 2014

(65) Prior Publication Data

US 2015/0293610 A1  Oct. 15, 2015

(51) Int. Cl.
*G06F 3/03* (2006.01)
*G06F 3/0354* (2013.01)
*G06T 5/00* (2006.01)
*G06T 5/20* (2006.01)
*G06T 5/50* (2006.01)
*G06T 7/00* (2017.01)

(52) U.S. Cl.
CPC ........ *G06F 3/0317* (2013.01); *G06F 3/03543* (2013.01); *G06T 5/002* (2013.01); *G06T 5/20* (2013.01); *G06T 5/50* (2013.01); *G06T 7/001* (2013.01); *G06T 2207/10016* (2013.01); *G06T 2207/20182* (2013.01)

(58) Field of Classification Search
CPC ................. G06F 3/0304; G06T 7/0014; G06T 2207/20182
See application file for complete search history.

(56) References Cited

U.S. PATENT DOCUMENTS

| | | | | |
|---|---|---|---|---|
| 5,442,407 A * | 8/1995 | Iu | ............................. | H04N 5/21 348/416.1 |
| 7,423,633 B2 | 9/2008 | Xie et al. | | |
| 8,189,954 B2 * | 5/2012 | Brosnan | ................ | G06F 3/0317 358/3.26 |
| 2002/0028025 A1 * | 3/2002 | Hong | ......................... | G06T 5/20 382/260 |
| 2006/0044267 A1 * | 3/2006 | Xie | .......................... | G06F 3/038 345/157 |
| 2008/0118179 A1 * | 5/2008 | Jeong | ........................ | G06K 9/40 382/275 |
| 2011/0069175 A1 * | 3/2011 | Mistretta | .................... | G06T 5/50 348/164 |
| 2012/0288187 A1 * | 11/2012 | Ichihashi | ................. | G06T 5/002 382/159 |
| 2014/0071156 A1 * | 3/2014 | Lee | ......................... | G06T 7/0002 345/611 |

FOREIGN PATENT DOCUMENTS

TW  I363982 B  5/2012

* cited by examiner

*Primary Examiner* — William Boddie
*Assistant Examiner* — Andrew Schnirel
(74) *Attorney, Agent, or Firm* — Hauptman Ham, LLP

(57) ABSTRACT

There is provided a failure identification method of an optical navigation device including the steps of: constructing a fixed noise map according to image frames captured by an image sensor; calculating a feature value of the fixed noise map; identifying whether the fixed noise map is uniform or not according to the feature value; and generating an alert signal when the fixed noise map is non-uniform for indicating failure of the optical navigation device.

20 Claims, 4 Drawing Sheets

OPTICAL NAVIGATION DEVICE AND FAILURE IDENTIFICATION METHOD THEREOF

BACKGROUND

1. Field of the Disclosure

This disclosure generally relates to an optical navigation device and, more particularly, to an optical navigation device and failure identification method thereof operating based on the noise map.

2. Description of the Related Art

Images captured by an optical tracking engine generally include a fixed noise pattern, wherein said fixed noise pattern may be caused by photodiodes of the image sensor, optical elements or the light source itself. In order to increase the accuracy of post-processing, the fixed noise pattern may be removed from the current image using algorithm according to a previously constructed noise map.

For example before shipment, it is able to illuminate an image sensor of the optical tracking engine with a uniform light source and record non-uniform positions of an outputted image to be served as a predetermined noise map. In actual operation, fixed noises can be eliminated using algorithm executed by a processor. In other words, conventionally said noise map is used to eliminate fixed noises in the process of image processing.

However, in the optical tracking system requiring high accuracy, in addition to the defects existing in the device itself, the operating environment may also cause the particle contamination of the optical tracking system so as to form the fixed noise. Accordingly, the optical tracking system is preferably able to identify whether failure may occur in the optical tracking engine according to the current image captured in actual operation.

SUMMARY

Accordingly, the present disclosure further provides an optical navigation device and failure identification method thereof that may construct a fixed noise map according to the image frames captured in operation and use the fixed noise map as a basis of failure identification. When the optical navigation device identifies according to the fixed noise map that the system may be failed, the user is informed to remove the source that could possibly cause fixed noises.

The present disclosure provides an optical navigation device and failure identification method thereof that may construct a fixed noise map according to the current frame captured in operation and give an alert when identifying failure according to the fixed noise map.

To achieve the above object, the present disclosure provides an optical navigation device including an image sensor and a navigation processor. The image sensor is configured to successively output image frames. The navigation processor is configured to update a transition noise map according to a first ratio of the transition noise map and a second ratio of a current frame, generate a fixed noise map when an update count reaches a counting threshold, and generate an alert signal when a feature value of the fixed noise map exceeds a feature threshold.

The present disclosure further provides a failure identification method of an optical navigation device including the steps of: identifying whether a movement occurs; updating a transition noise map according to a first ratio of the transition noise map and a second ratio of a current frame when the movement occurs; generating a fixed noise map when an update count reaches a counting threshold; and generating an alert signal indicating failure of the optical navigation device when a feature value of the fixed noise map exceeds a feature threshold.

The present disclosure further provides a failure identification method of an optical navigation device including the steps of: constructing a fixed noise map according to image frames captured by an image sensor; calculating a feature value of the fixed noise map; identifying whether the fixed noise map is uniform or non-uniform according to the feature value; and generating an alert signal indicating failure of the optical navigation device when the fixed noise map is non-uniform.

In one aspect, the first ratio is preferably much larger than the second ratio.

In one aspect, the feature value may be a standard deviation or a localized comparison of the fixed noise map.

In one aspect, the optical navigation device further includes an alert unit configured to represent an alert state according to the alert signal, e.g. representing the alert state by displaying, sound, illumination and/or vibration.

In one aspect, the optical navigation device is further configured to calculate a displacement according to a reference frame and the current frame, and update the transition noise map only when the displacement exceeds a displacement threshold, wherein an initial transition noise map of the transition noise map may be a predetermined ratio of an initial image frame captured by the image sensor in a startup procedure or after a sleep mode ends.

In the optical navigation device and failure identification method according to the embodiment of the present disclosure, when a displacement obtained by the optical navigation device exceeds a displacement threshold, a current frame captured by the image sensor is added to a transition noise map with a predetermined ratio and the added result is then used to replace (i.e. update) the transition noise map. When the displacement is smaller than the displacement threshold, the current frame is only used to calculate the displacement without being used to update the transition noise map thereby improving the performance of constructing the fixed noise map. When a predetermined update count is reached, the navigation processor takes the transition noise map as a fixed noise map and identifies the uniformity of the fixed noise map. When the uniformity of the fixed noise map is poor, it means that the optical navigation device needs to be maintained such that an alert is given to inform the user so as to avoid misoperation of the optical navigation device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
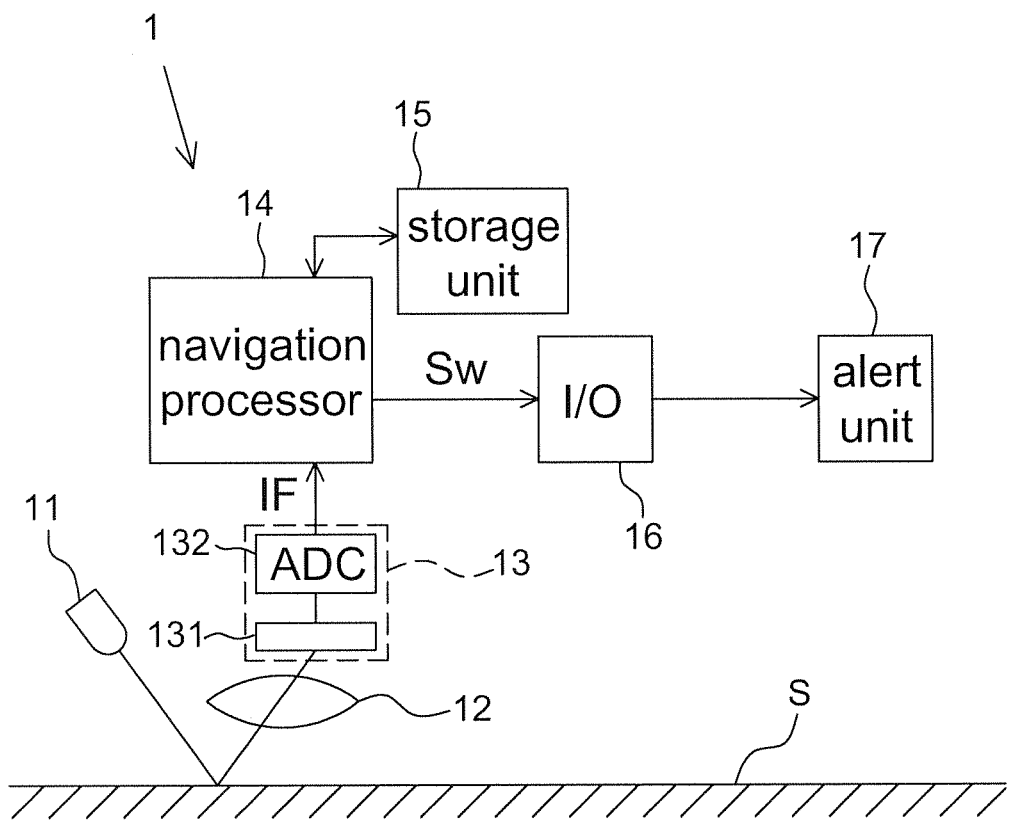
FIG. 1 shows a schematic block diagram of the optical navigation device according to an embodiment of the present disclosure.

Referring to FIG. 1, it shows a schematic block diagram of the optical navigation device 1 according to an embodiment of the present disclosure. The optical navigation device 1 is configured to construct a fixed noise map indicating the noise amount of an operation environment according to the image frames captured in operation, wherein said noise may include the defects of the optical system itself and particle contamination. The optical navigation device 1 then calculates a feature value of the fixed noise map for indicating uniformity of the fixed noise map, wherein the feature value may be a standard deviation or a localized comparison of the fixed noise map, but not limited to. In the present disclosure, the noise map indicates a noise distribution in the image frame captured by the optical navigation device 1 so that the noise map and the image frame may have identical sizes and resolutions.

In one embodiment, the localized comparison (indicating uniformity U) may be defined as a calculation result of at least two pixel values within a predetermined range around each pixel value G(x,y) in the fixed noise map, wherein the localized comparison may be represented by equation (I). For example in one embodiment, the uniformity U may be a sum of absolute differences between each pixel value G(x,y) in the fixed noise map and at least one neighbor pixel value within a predetermined range around the pixel value G(x,y), but not limited thereto. The feature value may also be calculated by other conventional methods for calculating the uniformity of a digital matrix.

$$GR = \sum_{x,y} \text{filter}(x, y) \otimes G(x, y) \quad (1)$$

Finally, the optical navigation device 1 identifies whether failure may occur according to the feature value and gives an alert, if failure occurs, to inform the user to remove the source that could possibly cause the failure, e.g. cleaning or exchanging components.

Referring to FIG. 1 again, the optical navigation device 1 may include a light source 11, at least one light guide 12 (a lens shown herein as an example), an image sensor 13, a navigation processor 14, a storage unit 15, an input/output (I/O) unit 16 and an alert unit 17, wherein the image sensor 13, navigation processor 14, storage unit 15 and I/O unit 16 may be formed as a control chip. It should be mentioned that the control chip may be implemented by software, hardware, firmware or any combination thereof. In addition, the storage unit 15 may be disposed inside the navigation processor 14 and not limited to that shown in FIG. 1.

In the present disclosure, the optical navigation device 1 may be moved on a work surface S, or the optical navigation device 1 has a fixed position and the work surface S is moved with respect to the optical navigation device 1. In addition, the optical navigation device 1 may further include a light control unit (not shown) configured to control the ON/OFF of the light source 11.

The light source 11 may be a coherent light source (e.g. laser), a partial coherent light source or an incoherent light source (e.g. light emitting diode) which is configured to illuminate the work surface S for providing reflected light impinge on the image sensor 13. However, if the ambient light is enough, the system light source 11 may not be implemented and only the ambient light is used.

The light guide 12 is configured to improve the sensing efficiency of the image sensor 13. In addition, the optical navigation device 1 may further include other light guide associated with the light source 11 so as to improve the emission efficiency thereof. In addition, only one light guide may be used to achieve the effects mentioned above, and the shape and position of the light guide may be determined according to different applications and not limited to that shown in FIG. 1.

The image sensor 13 may include a sensing array 131 and an analog-to-digital converter (ADC) 132. The sensing array 131 may include a plurality of light sensing elements, e.g. photodiodes arranged in matrix so as to output electrical signals according to the sensed light intensity (e.g. the intensity of reflected light from the work surface S). The ADC 132 converts the electrical signals to digital signals and outputs the image frame IF. The image sensor 13 may successively output the image frame IF at a sensing frequency, wherein a value of the sensing frequency may be determined according to its application without particular limitation.

The navigation processor 14 is configured to update a transition noise map according to a first ratio of the transition noise map and a second ratio of a current frame, wherein the transition noise map is referred to the incomplete fixed noise map being temporarily stored in the storage unit 15, and the current frame is referred to a latest image frame captured by the image sensor 13. When an update count of updating the transition noise map reaches a counting threshold, the transition noise map is served as a fixed noise map by the navigation processor 14; i.e. the transition noise map becomes the fixed noise map after being updated by a plurality of times determined by the counting threshold. When a feature value of the fixed noise map exceeds a feature threshold, the navigation processor 14 generates an alert signal Sw (described later). In addition, the navigation processor 14 may further calculate a displacement according to a reference frame and the current frame and updates the transition noise map only when the displacement exceeds a displacement threshold, wherein the method of calculating the displacement may use the correlation between image frames IF and since it is well known, details thereof are not described herein. In addition, according to different applications, the navigation processor 14 may still update the transition noise map even though the displacement does not exceed the displacement threshold.

The storage unit 15 may be a computer readable medium and configured to save the transition noise map, counting threshold, count value, feature threshold, displacement threshold, reference frame, algorithm information, area threshold, data required in operation and so on.

The I/O unit 16 is configured to wiredly or wirelessly communicate with outside of the optical navigation device 1, e.g. transmitting the displacement to a host or transmitting the alert signal Sw to the alert unit 17. Since wired and wireless communication techniques are well known, details thereof are not described therein.

The alert unit 17 may be a display device, a speaker, an illumination device and/or a vibrator, and configured to represent the alert state according to the alert signal Sw by displaying, sound, illumination and/or vibration, but the present disclosure is not limited thereto. Accordingly, when the alert state is represented, the user may clean or replace associated component(s) to avoid misoperation.

Figure 2:
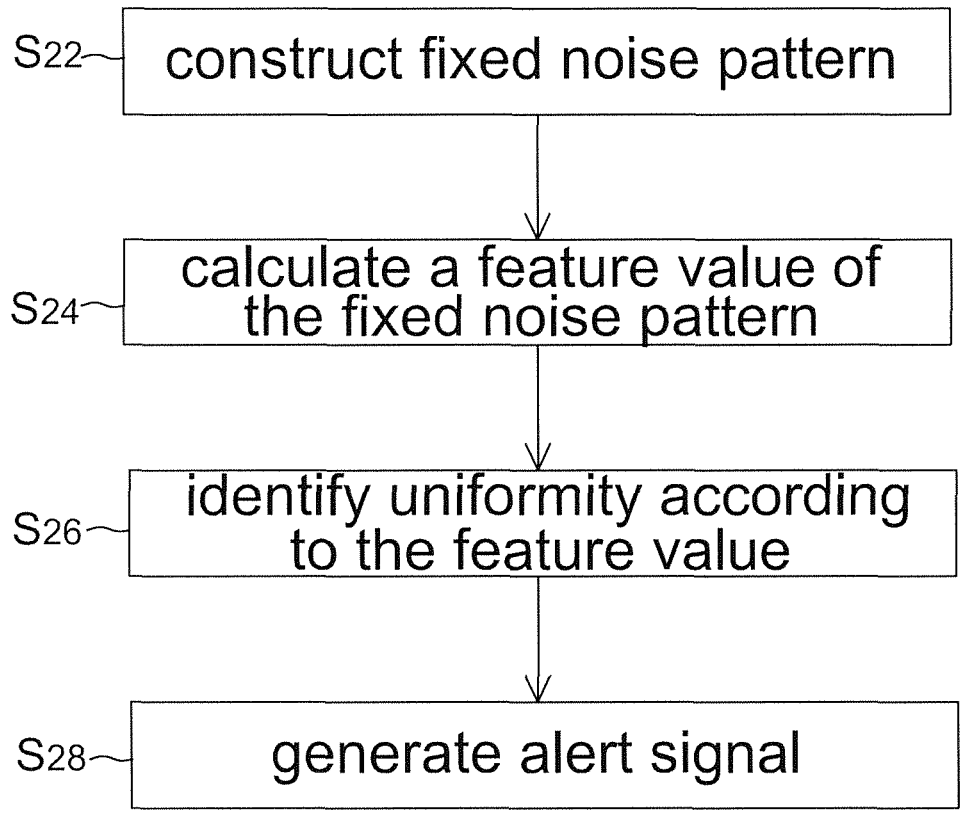
FIG. 2 shows a flow chart of the failure identification method of an optical navigation device according to an embodiment of the present disclosure.

Referring to FIG. 2, it shows a flow chart of the failure identification method of an optical navigation device according to an embodiment of the present disclosure, which includes the steps of: constructing a fixed noise map according to image frames captured by an image sensor (Step $S_{22}$); calculating a feature value of the fixed noise map (Step $S_{24}$); identifying whether the fixed noise map is uniform or non-uniform according to the feature value (Step $S_{26}$); and generating an alert signal for indicating failure of the optical navigation device when the fixed noise map is non-uniform (Step $S_{28}$).

Step $S_{22}$: In the present disclosure, the fixed noise map is constructed according to image frames captured in operation rather than before shipment. Accordingly, the navigation processor 14 may construct the fixed noise map according to the image frames IF successively outputted by the image sensor 13, e.g. constructing the fixed noise map according to the method disclosed in U.S. Pat. No. 7,423,633 or 8,189,954, but not limited thereto.

Figure 3:
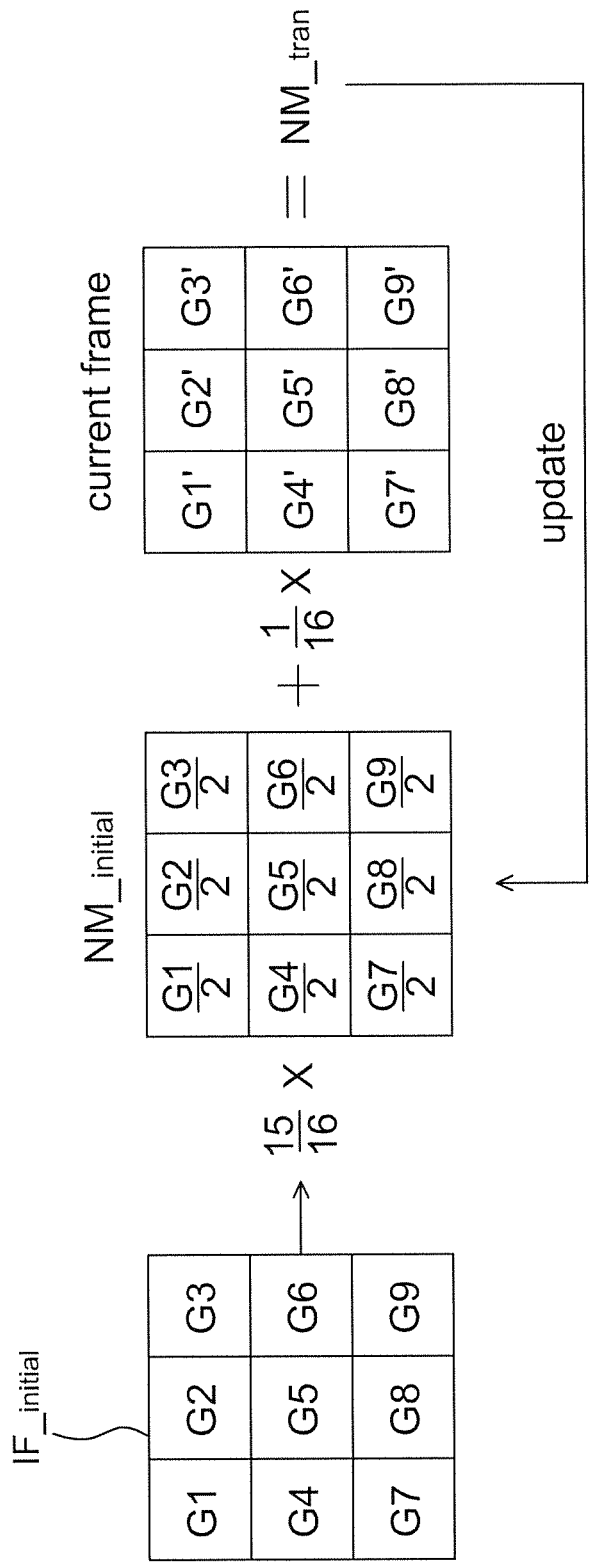
FIG. 3 shows a schematic diagram of constructing a fixed noise map in the optical navigation device according to the embodiment of the present disclosure.

In one embodiment, the navigation processor 14 may calculate a sum of a first ratio of a transition noise map and a second ratio of the image frame IF, wherein the transition map is the one continuously updated according to the image frames captured in operation of the navigation processor 14 before the fixed noise map has been constructed. When the transition noise map is updated a plurality of times determined by a counting threshold, the transition noise map is served as the fixed noise map. In one embodiment, an initial transition noise map may be set as a predetermined ratio of an initial image frame captured by the image sensor 13 during the startup or wakeup of the optical navigation device 1, e.g. FIG. 3 showing an initial image frame $IF_{\_initial}$ and an initial transition noise map $NM_{\_initial}=IF_{\_initial}/2$, wherein said predetermined ratio is shown to be 0.5 herein, but the present disclosure is not limited thereto. In addition, as the present disclosure is to construct the fixed noise map according to the image frames captured in operation, the first ratio is preferably much larger than the second ratio such that more current operating components may be included in the noise map. For example, FIG. 3 shows that the first ratio may be 15/16 and the second ratio may be 1/16, but the present disclosure is not limited thereto.

Referring to FIG. 3 again, a transition noise map $NM_{\_tran}$, may be obtained according to a sum of the first ratio of an initial transition noise map $NM_{\_initial}$ and the second ratio of a current frame. Then, the transition noise map $NM_{\_tran}$ is used to replace (e.g. update) the initial transition noise map $NM_{\_initial}$, and a sum of the first ratio of the transition noise map $NM_{\_tran}$ and the second ratio of a new current frame is calculated. By repeating the updating process by a plurality of times determined by the counting threshold, the fixed noise map is obtained.

Step $S_{24}$: Next, the navigation processor 14 calculates a feature value of the fixed noise map according to a pre-stored algorithm for indicating the uniformity of the fixed noise map, wherein said feature value may be a standard deviation, a localized comparison or other values for indicating uniformity.

Step $S_{26}$: Next, the navigation processor 14 compares the feature value with a feature threshold, wherein when the feature value exceeds the feature threshold the fixed noise map is identified being non-uniform, whereas when the feature value is smaller than the feature threshold, the fixed noise map is identified being uniform. A value of the feature threshold may be determined according to the noise amount that can be endured by the navigation processor 14 such that it may be different according to different applications and requirements.

Step $S_{28}$: Finally, when the fixed noise map is identified being non-uniform, the navigation processor 14 outputs an alert signal Sw to be transmitted to the alert unit 17 via the I/O unit 16. The alert unit 17 then informs the user with different ways according to its type that the optical navigation device 1 may be failed and required to be maintained in order to avoid the misoperation. In the present disclosure, the alert unit 17 may be disposed independent from the optical navigation device 1 without particular limitation, e.g. integrated in a host.

Figure 4:
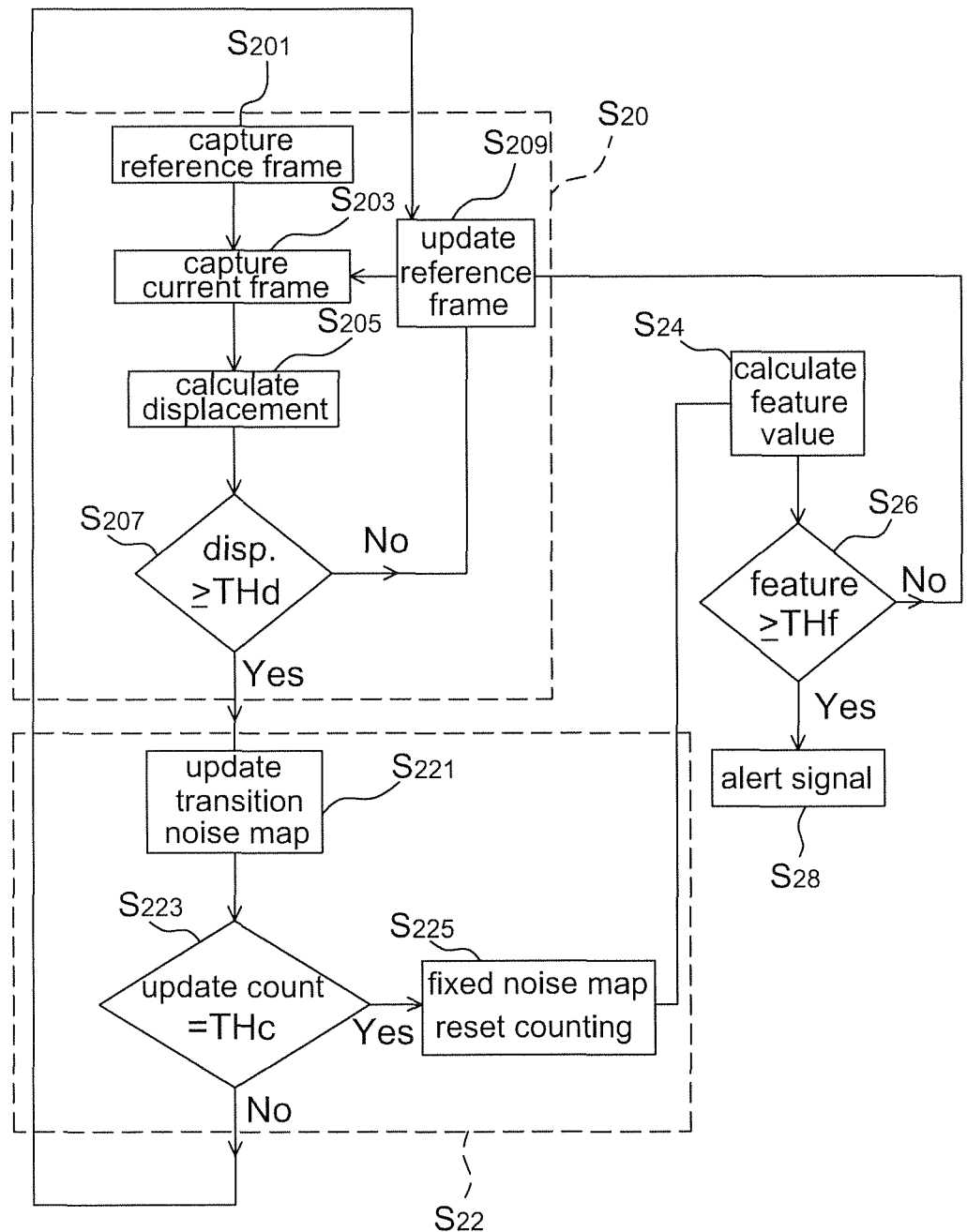
FIG. 4 shows a flow chart of the failure identification method of an optical navigation device according to another embodiment of the present disclosure.

Referring to FIG. 4, it shows a flow chart of the failure identification method of an optical navigation device according to another embodiment of the present disclosure, which further includes a movement identification step $S_{20}$. Accordingly, the failure identification method of this embodiment includes the steps of: identifying whether a movement occurs (Step $S_{20}$); constructing a fixed noise map (Step $S_{22}$); calculating a feature value of the fixed noise map (Step $S_{24}$); identifying uniformity according to the feature value (Step $S_{26}$); and generating an alert signal (Step $S_{28}$); wherein the Steps $S_{24}$, $S_{26}$ and $S_{28}$ are identical to those of FIG. 2 and thus details thereof are not repeated herein. In the Step $S_{26}$ of this embodiment, when a feature value of the fixed noise map exceeds (e.g. larger than or equal to) a feature threshold THf, the Step $S_{28}$ is entered so as to generate an alert signal for indicating failure of the optical navigation device 1, whereas when a feature value of the fixed noise map is smaller than the feature threshold THf, the Step $S_{20}$ is returned so as to update the reference frame with the current frame (Step $S_{209}$) and reconstruct a fixed noise map for the next identification. Herein only the Steps $S_{20}$ and $S_{22}$ are further explained.

Step $S_{20}$: In this step, the navigation processor 14 calculates a displacement with respect to the work surface S and identifies whether the displacement exceeds (e.g. larger than or equal to) a displacement threshold THd. No matter whether the displacement exceeds the displacement threshold THd or not, the navigation processor 14 transmits the displacement via the I/O unit 16, e.g. transmitting to a host. In other words, besides for cursor control as an example, the displacement may also be used to determine whether to update the noise map.

In this embodiment, the Step $S_{20}$ further includes the following sub-steps. The image sensor 13 captures a reference frame (Step $S_{201}$). The image sensor 13 captures a current frame (Step $S_{203}$), wherein the image sensor 13 may capture a current frame every sampling cycle. The navigation processor 14 calculates a displacement according to the reference frame and the current frame (Step $S_{205}$). The navigation processor 14 compares the displacement with a displacement threshold THd (Step $S_{207}$); when the displacement exceeds the displacement threshold THd, it means that a movement occurs and the step $S_{22}$ is entered; whereas when the displacement is smaller than the displacement threshold THd, is means that a movement does not occur and the reference frame is updated by the current frame (Step $S_{209}$) and the process returns to the Step $S_{703}$ to allow the image sensor 13 to capture a new current frame. In this embodiment, the navigation processor 14 may calculate the displacement according to the correlation between the reference frame and the current frame. In addition, the reference frame and the current frame may respectively be a differential image of a bright image, which corresponds to the turning on of the light source 11, and a dark image, which corresponds to the turning off of the light source 11. In this embodiment, the sampling cycle may be determined according to the image sensor 13 being employed.

Step $S_{22}$: This step further includes the following substeps. When the movement occurs, the navigation processor 14 updates a transition noise map according to a first ratio of the transition noise map and a second ratio of the current frame (Step $S_{221}$). And when an update count reaches a counting threshold THc (Step $S_{223}$), a fixed noise map is generated and the update count is reset to zero (Step $S_{225}$), wherein when the update count does not reach the counting threshold THc, the reference frame is replaced by the current frame (Step $S_{209}$) and the process returns to the Step $S_{203}$ to allow the image sensor 13 to capture a new current frame. As mentioned above, an initial transition noise map $NM\_{initial}$ of the transition noise map may be a predetermined ratio of an initial image frame captured in the startup or wakeup of the optical navigation device 1 and saved in the storage unit 15 as shown in FIG. 3. The counting threshold THc may be a fixed predetermined value saved in the storage unit 15 or set by the user according to the operation conditions.

Next, the navigation processor 14 calculates a feature value of the fixed noise map (Step $S_{24}$) and compares the feature value with a feature threshold THf (Step $S_{26}$), and generates an alert signal Sw when the feature value exceeds (e.g. larger than or equal to) the feature threshold THf (Step $S_{28}$).

In another embodiment, the Step $S_{207}$ in FIG. 4 may not be implemented; i.e. the navigation processor 14 may perform the Step $S_{221}$ of updating the transition noise map according to every current frame captured, not in a sleep mode, by the image sensor 13, wherein the definition of the sleep mode is well known and thus details thereof are not described herein. In addition, in some applications the navigation processor 14 does not identify whether the movement occurs again once a movement has been identified; i.e. the navigation processor 14 only identifies the first movement and then performs the Step $S_{221}$ of updating the transition noise map according to every current frame till the optical navigation device 1 stops operation, e.g. being turned off or entering a sleep mode.

In another embodiment, the Step $S_{24}$ of calculating the feature value in FIG. 4 may be performed in Step $S_{203}$. For example, the navigation processor 14 may calculate the feature value of every current frame captured by the image sensor 13, and the feature value is accumulated at the same time the transition noise map is updated (i.e. $S_{207}$ is satisfied) whereas the feature value is not accumulated (e.g. abandoned) when the transition noise map is not updated (i.e. $S_{207}$ is not satisfied). Accordingly, when the fixed noise map is obtained (i.e. $S_{225}$), the feature value of the fixed noise map is obtained at the same time such that the Step $S_{24}$ may be omitted without being performed with an individual step. Said feature values may be stored in the storage unit 15.

In another embodiment, in the Step $S_{26}$ the area of individual noise in the fixed noise map may further be identified so as to determine whether to generate the alert signal Sw. For example, when areas of all individual noise are smaller than an area threshold for performing the navigation operation, the navigation processor 14 may not generate the alert signal Sw so as to ignore the negligible error; whereas when the area of at least a part of individual noise is larger than the area threshold, the navigation processor 14 generates the alert signal Sw. In other words, the navigation processor 14 may determine whether to output the alert signal Sw according to the surface feature of the work surface S. It should be mentioned that the step of comparing the noise area and the area threshold may be adapted to the Step $S_{26}$ of both FIGS. 2 and 4. The area threshold may be determined according to the detection accuracy required.

As mentioned above, the conventional optical tracking engine utilizes algorithm to remove fixed noises in the image frame according to a previously constructed predetermined noise map, but the conventional method cannot eliminate the noise caused by operational environment in actual operation. Therefore, the present disclosure further provides an optical navigation device (FIG. 1) and a failure identification method thereof (FIGS. 2 and 4) that may construct a fixed noise map according to image frames captured in operation to accordingly identify whether the optical navigation device fails or not.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, comprising:
   an image sensor configured to successively output image frames; and
   a navigation processor configured to
      update a transition noise map according to a first ratio of the transition noise map and a second ratio of a current frame,
      generate a fixed noise map when an update count, which is a number of times of updating the transition noise map by calculating a sum of the first ratio of the transition noise map and the second ratio of the current frame, reaches a fixed predetermined counting threshold which is larger than 1, and
      generate an alert signal when a feature value of the fixed noise map exceeds a feature threshold.

2. The optical navigation device as claimed in claim 1, wherein the navigation processor is further configured to
   calculate a displacement according to a reference frame and the current frame, and
   update the transition noise map only when the displacement exceeds a displacement threshold.

3. The optical navigation device as claimed in claim 1, wherein the first ratio is larger than the second ratio.

4. The optical navigation device as claimed in claim 1, wherein an initial transition noise map is a predetermined ratio of a first image frame captured by the image sensor in a startup procedure or after a sleep mode ends.

5. The optical navigation device as claimed in claim 1, further comprising an alert unit configured to represent an alert state according to the alert signal by at least one of displaying, sound, illumination and vibration.

6. The optical navigation device as claimed in claim 1, wherein the navigation processor is further configured to compare noise areas of the fixed noise map with an area threshold so as to determine whether to generate the alert signal.

7. The optical navigation device as claimed in claim 1, wherein the feature value is a standard deviation or a localized comparison of the fixed noise map.

8. The optical navigation device as claimed in claim 1, wherein the navigation processor is further configured to reset the update count when the update count reaches the counting threshold.

9. The optical navigation device as claimed in claim 1, further comprising a storage unit configured to save the transition noise map, the counting threshold, the feature threshold and the update count.

10. A failure identification method of an optical navigation device, comprising:
   identifying whether a movement occurs;
   updating a transition noise map according to a first ratio of the transition noise map and a second ratio of a current frame when the movement occurs;
   generating a fixed noise map when an update count, which is a number of times of updating the transition noise map by calculating a sum of the first ratio of the transition noise map and the second ratio of the current frame, reaches a fixed predetermined counting threshold which is larger than 1; and
   generating an alert signal indicating failure of the optical navigation device when a feature value of the fixed noise map exceeds a feature threshold.

11. The failure identification method as claimed in claim 10, wherein the first ratio is larger than the second ratio.

12. The failure identification method as claimed in claim 10, wherein an initial transition noise map is a predetermined ratio of a first image frame captured by an image sensor in a startup procedure or after a sleep mode ends.

13. The failure identification method as claimed in claim 10, further comprising:
   representing, by an alert unit, an alert state according to the alert signal.

14. The failure identification method as claimed in claim 10, wherein the feature value is a standard deviation or a localized comparison of the fixed noise map.

15. The failure identification method as claimed in claim 10, further comprises:
   resetting the update count when the update count reaches the counting threshold.

16. A failure identification method of an optical navigation device, comprising:
   constructing a fixed noise map according to image frames captured by an image sensor, wherein the fixed noise map is generated when a number of times of updating a transition noise map, by calculating a sum of a first ratio of the transition noise map and a second ratio of the image frames, reaches a fixed predetermined counting threshold which is larger than 1, and the transition noise map is initially determined as a predetermined ratio of a first image frame captured by the image sensor in a startup procedure or after a sleep mode ends;
   calculating a feature value of the fixed noise map;
   identifying whether the fixed noise map is uniform or non-uniform according to the feature value; and
   generating an alert signal indicating failure of the optical navigation device when the fixed noise map is non-uniform.

17. The failure identification method as claimed in claim 16, wherein in the calculating the feature value, a standard deviation or a localized comparison of the fixed noise map is calculated.

18. The failure identification method as claimed in claim 16, wherein
   the fixed noise map is non-uniform when the feature value exceeds a feature threshold; and
   the fixed noise map is uniform when the feature value is smaller than the feature threshold.

19. The failure identification method as claimed in claim 16, further comprising:
   representing, by an alert unit, an alert state according to the alert signal.

20. The optical navigation device as claimed in claim 1, wherein the navigation processor is configured to update the transition noise map using successive image frames outputted by the image sensor.

* * * * *